(12) United States Patent
Yoshida

(10) Patent No.: US 9,122,086 B2
(45) Date of Patent: Sep. 1, 2015

(54) DISPLAY APPARATUS

(71) Applicant: CANON KABUSHIKI KAISHA, Tokyo (JP)

(72) Inventor: Takashi Yoshida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 14/141,073

(22) Filed: Dec. 26, 2013

(65) Prior Publication Data

US 2014/0184981 A1    Jul. 3, 2014

(30) Foreign Application Priority Data

Dec. 27, 2012  (JP) .................. 2012-283776

(51) Int. Cl.
*G02F 1/1333*    (2006.01)
(52) U.S. Cl.
CPC ............... *G02F 1/133308* (2013.01); *G02F 2001/133311* (2013.01); *G02F 2001/133331* (2013.01); *G02F 2201/50* (2013.01)

(58) Field of Classification Search
CPC ............ G02F 1/1313; G02F 1/133308; G02F 1/133608; G02F 1/13452; G02F 2001/133317; G02F 2201/503; G02F 1/133615; G02F 2201/465; G02F 2001/133311
USPC ...................................... 349/58, 60
See application file for complete search history.

(56) References Cited

U.S. PATENT DOCUMENTS 8,885,110 B1 *  11/2014  St. Clair ................ 348/836

FOREIGN PATENT DOCUMENTS

JP          07-209635 A        8/1995

* cited by examiner

*Primary Examiner* — Mike Qi
(74) *Attorney, Agent, or Firm* — Cowan, Liebowitz & Latman, P.C.

(57) ABSTRACT

A display apparatus includes a liquid crystal panel unit including a quadrilateral display portion, a screen protector protecting the liquid crystal panel unit, and a spacer disposed between the liquid crystal panel unit and the screen protector so as to surround the display portion. The spacer has a cut, the cut cutting its corresponding side of the spacer.

9 Claims, 5 Drawing Sheets

DISPLAY APPARATUS

BACKGROUND OF THE INVENTION

1. Field of the Invention

The present invention relates to a display apparatus provided with a portable electronic device such as a digital camera.

2. Description of the Related Art

In recent years, portable electronic devices such as digital cameras have been significantly reduced both in thickness and cost.

A display apparatus, such as a liquid crystal panel, equipped with a digital camera accounts for a large percentage of the body of the digital camera. Liquid crystal panels generally include thin glass substrates, and thus prone to damage by external force or to inconsistencies in display caused by change in orientation due to flexure. To overcome these drawbacks, a screen protector composed of a colorless, transparent resin with excellent light transmittance, such as polymethyl methacrylate, is provided with the exterior cover of a liquid crystal panel to protect the panel such that the panel is prevented from direct exposure to the outside.

Conventionally, a screen protector has been attached to a display apparatus often by adhesion to an exterior cover. On the other hand, a liquid crystal panel has been often attached to the body of a digital camera. This is because, in the case of a liquid crystal panel, a flexible substrate to be adhered to the body of a digital camera is required to be shortened as much as possible for the purpose of cost saving. Taking variations in assembling and parts into consideration, a large clearance needs to be created between a screen protector and a liquid crystal panel. This has been one factor which prevents reduction in the thickness of a digital camera.

Japanese Patent Laid-Open No. 07-209635 discloses a method for reducing the thickness of a digital camera by affixing a colorless, transparent resin screen protector directly to a liquid crystal panel to decrease the clearance between the screen protector and the liquid crystal panel. Japanese Patent Laid-Open No. 07-209635 also discloses a technique for filling or cohereing a gel-state or low-repulsion-elastic transparent resin between the screen protector and the liquid crystal panel to achieve a higher viewability.

However, the method disclosed in Japanese Patent Laid-Open No. 07-209635 adopts a special technique to affix the screen protector to the liquid crystal panel, thus causing a problem of increase in cost.

One solution to this problem is to affix the screen protector to the liquid crystal panel by inserting a spacer therebetween. The spacer is designed in a three-layered structure including, in order from outside, a first double-sided adhesive tape, a PET sheet and a second double-sided adhesive tape to ensure a minimum-required clearance for preventing a contact of the screen protector and the liquid crystal panel in a thickness direction. The spacer is approximately square-shaped not to decrease the viewability of the center portion of the display surface of the liquid crystal panel. In addition, the spacer tightly shuts a space between the screen protector and the display surface of the liquid crystal panel, which avoids entry of dust and the like into the display surface.

However, such adhesion of the screen protector and the liquid crystal panel with the spacer has a problem. The problem is that, in case of change in environment (especially under high temperature and high humidity), the screen protector changes its shape to come into contact with the display surface of the liquid crystal panel at the vicinity of the center portion of the display area, causing contact cracks on the display surface of the liquid crystal panel. One possible cause is that the thermal expansion coefficient of a transparent resin employed as a screen panel is greater than those of a glass employed as a PET sheet or as a liquid crystal panel and a metal employed as a bezel. This difference in thermal expansion coefficient makes the transparent resin easily change its shape by an increase in temperature. Another possible cause is that if a transparent resin employed as a screen panel absorbs humidity, it easily changes its shape.

A possible solution of expanding the clearance by increasing the thickness of the spacer to prevent a contact of the screen protector and the liquid crystal panel, however, cannot achieve reduction in thickness.

SUMMARY OF THE INVENTION

In view of these problems, it is an object of the present invention to provide a display apparatus which is capable of operating without malfunction even in case of change in environment (especially under high temperature and high humidity) and which ensures reduction both in thickness and cost.

A display apparatus as an aspect of the present invention includes a liquid crystal panel unit including a quadrilateral display portion, a screen protector protecting the liquid crystal panel unit, and a spacer disposed between the liquid crystal panel unit and the screen protector so as to surround the display portion. The spacer has a cut, the cut cutting its corresponding side of the spacer.

Further features of the present invention will become apparent from the following description of exemplary embodiments (with reference to the attached drawings).

DESCRIPTION OF THE EMBODIMENTS

A detailed description will be given of an embodiment of the present invention with reference to the accompanying drawings.

Figure 1A:
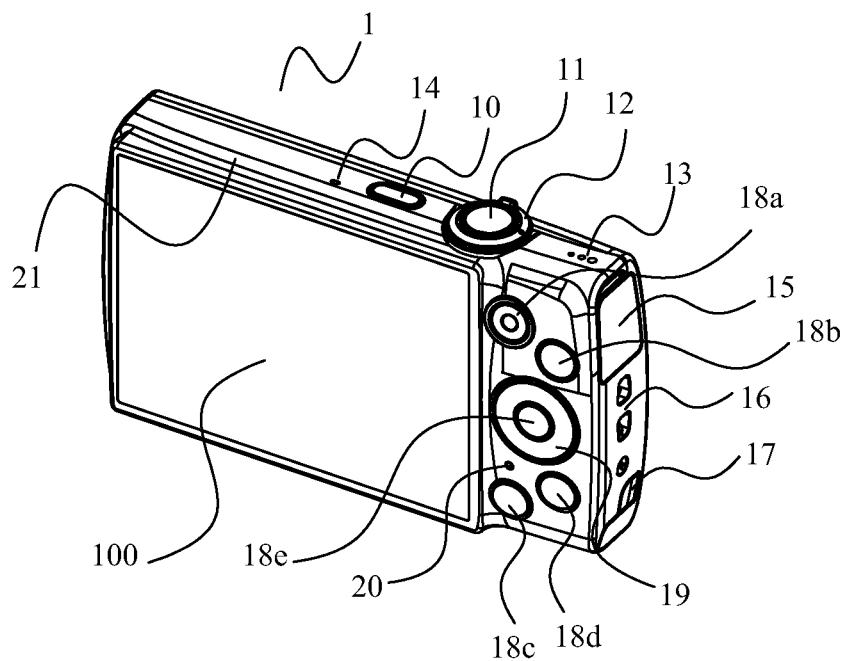
FIGS. 1A and 1B are external perspective views of a digital camera according to an embodiment of the present invention.
Figure 1B:
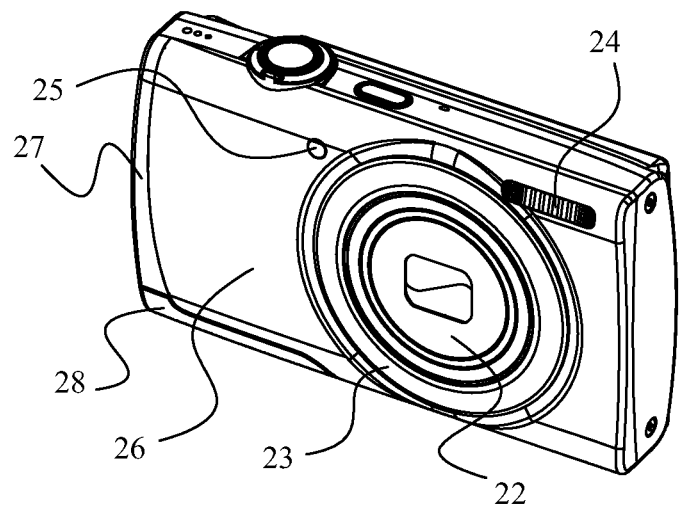

FIGS. 1A and 1B are external perspective views of a digital camera according to an embodiment of the present invention. FIG. 1A is a back perspective view and FIG. 1B is a front perspective view. On the upper surface of a digital camera 1, there are disposed a power button 10 for performing an on/off switching operation, a release button 11 for starting a photo-shooting operation, a zoom lever 12 for performing a zooming operation, a speaker 13, and a microphone 14 and the like.

At the grip side surface of the digital camera 1, there is disposed a connector cover 15 for covering an external terminal connector; at the bottom side of the connector cover 15, a strap attaching portion 16 for threading a wrist strap; and at the bottom side of the strap attaching portion 16, a coupler cover 17. The coupler cover 17 covers a notch portion which allows to be inserted a power cable that is coupled to an approximately-battery-shaped DC coupler coupled to an AC adapter.

At the back surface of the digital camera 1, there is disposed a display apparatus 100 configured to display an image taken. Disposed at the right relative to the display apparatus 100 are operation buttons 18a to 18e, a cross shape direction operation button 19, and a LED display portion 20. The operation of these buttons allows a display of a taken image on the display apparatus 100 and various settings. A rear cover 21 is an exterior cover for covering the periphery of these buttons and of the display apparatus 100.

At the front surface of the digital camera 1, there is disposed a lens unit 22 configured to capture an object image, at the upper right portion of the display apparatus 100, a stroboscopic unit 24, and at the upper left portion of the lens unit 22, an LED auxiliary light portion 25. A front cover 26 is an external cover for covering the periphery of the lens unit 22 and of the stroboscopic unit 24. At the portion of the front cover 26 constituting the periphery of the lens unit 22, there is disposed a front ring 23. A side cover 27 is an external cover defining a grip side surface starting from the left end of the front surface of the digital camera 1. A battery cover 28 defining a bottom surface starting from the lower left portion of the front surface of the digital camera 1 is opened or closed when the battery is lifted out.

Figure 2:
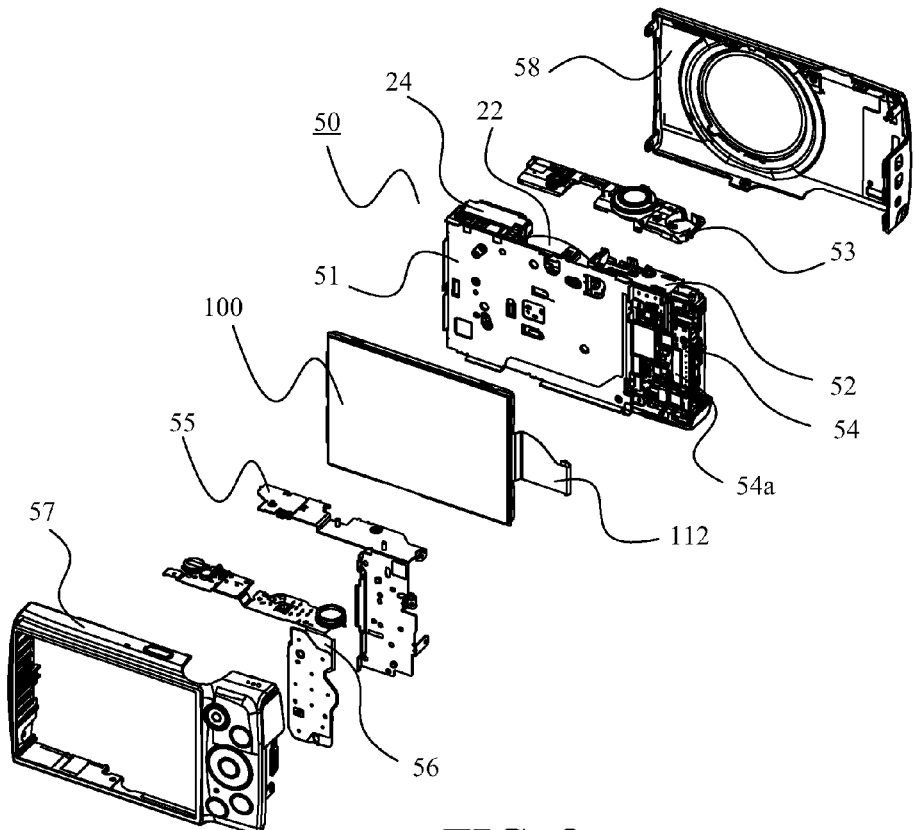
FIG. 2 is an exploded perspective view of the digital camera.

Referring now to FIG. 2, the structure of the digital camera 1 will be explained. FIG. 2 is an exploded perspective view of the digital camera 1. A main chassis 51 to which the lens unit 22, the stroboscopic unit 24, a battery box unit 52 for housing the battery, and an electronic circuit substrate 54 configured to perform signal processing are attached constitutes a digital camera body 50.

A flexible circuit substrate 112 at the right end of the display apparatus 100 is inserted into a connector 54a implemented on the electronic circuit substrate 54 to put the display apparatus 100 on the main chassis 51. Then, a sub chassis 55 serving as a receiver for the operation portions of the upper and back surfaces is attached to the digital camera body 50. After that, a flexible circuit substrate 56 on which a button switch, the speaker 13 and the microphone 14 are implemented is attached onto the sub chassis 55. Next, a top base unit 53 on which the release button 11 and the zoom lever 12 are disposed is attached to the upper surface of the digital camera body 50. Finally, a rear cover unit 57 is attached from the back surface of the digital camera body 50 and a front cover unit 58 is attached from the front surface, constituting the digital camera 1.

Figure 3:
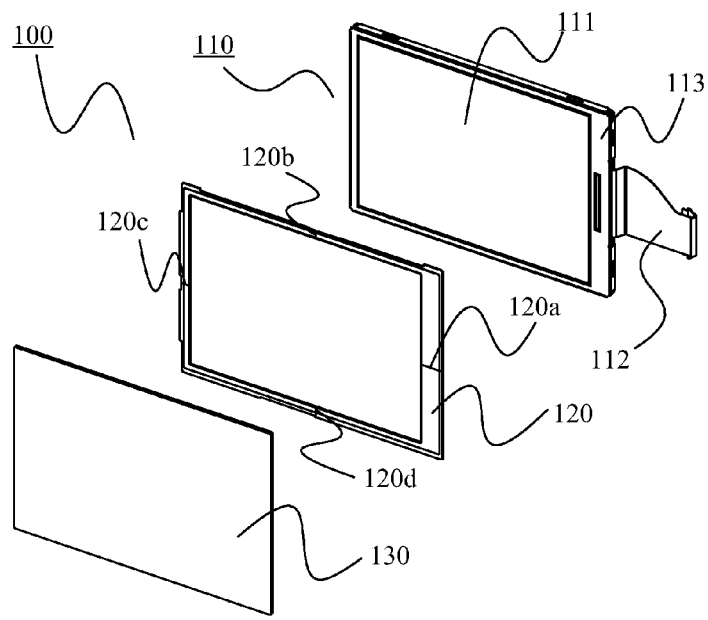
FIG. 3 is an exploded perspective view of a display apparatus.

Referring now to FIG. 3, the structure of the display apparatus 100 will be explained. FIG. 3 is an exploded perspective view of the display apparatus 100.

The display apparatus 100 includes a liquid crystal panel unit 110, a spacer 120, and a screen protector 130.

The liquid crystal panel unit 110 includes a quadrilateral (e.g., rectangle or square) liquid crystal panel 111, a flexible circuit substrate 112, and a bezel 113. In addition, a back light unit (not shown in the figure) configured to irradiate a light to the liquid crystal panel 111 is disposed on the liquid crystal panel unit 110.

As illustrated in FIG. 3, a spacer 120 has, at the approximately center portion of each side, a plurality of cuts 120a to 120d, each located in an approximately orthogonal direction relative to each corresponding side of the spacer 120. Each of the cuts 120a to 120d divides its corresponding side of the spacer 120 into two equal portions.

A screen protector 130 is composed of polymethyl methacrylate, i.e., a colorless, transparent synthetic resin material. Onto the affixing surface of the screen protector 130, a black mask printing is done to make the spacer 120 and the bezel 113 impossible to be seen from the outside.

Figure 4:
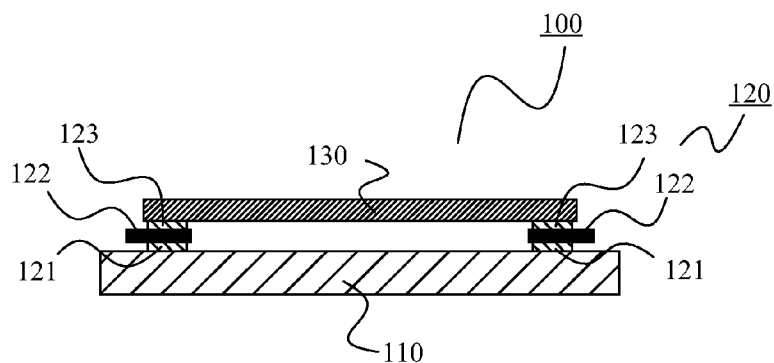
FIG. 4 is a cross-sectional schematic view of the display apparatus.

FIG. 4 is a cross-sectional schematic view of the display apparatus 100.

The spacer 120 has three layers. A first adhesion layer 121 and a second adhesion layer 123 are composed of so-called double-faced tapes, i.e., tapes both of whose surfaces are adhesive-treated. The first adhesion layer 121 affixes and secures the liquid crystal panel unit 110 and the spacer 120, and the second adhesion layer 123 the spacer and the screen protector 130, respectively.

A spacer layer 122 is composed of a black synthetic resin sheet. In this embodiment, a polyethylene terephthalate sheet, so-called a PET sheet, is employed. The spacer layer 122 ensures a clearance between the liquid crystal panel unit 110 and the screen protector 130. As illustrated in FIG. 4, since the outer dimension of the spacer layer 122 is larger than that of the screen protector 130, the edge of the spacer layer 122 protrudes more outside than that of the screen protector 130. This makes the inner components of the digital camera 1, such as the bezel 113 and the flexible circuit substrate 112, difficult to be seen from a gap between the screen protector 130 and the opening of the rear cover 21.

Figure 5A:
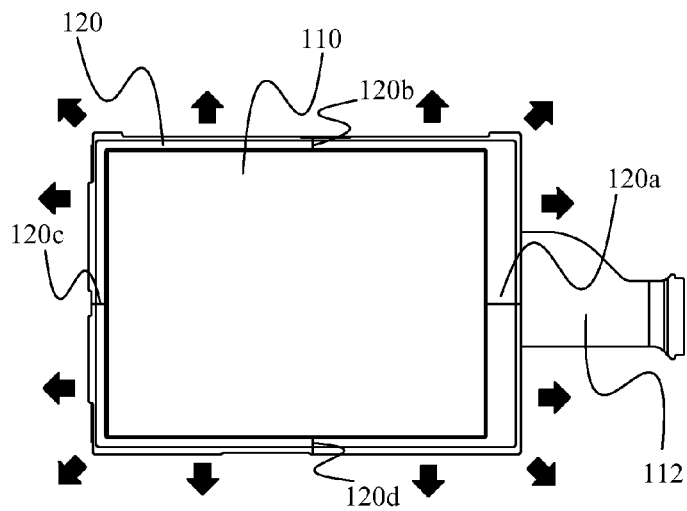
FIGS. 5A and 5B are views of the display apparatus to which a spacer is affixed which are seen from a display surface direction.
Figure 5B:
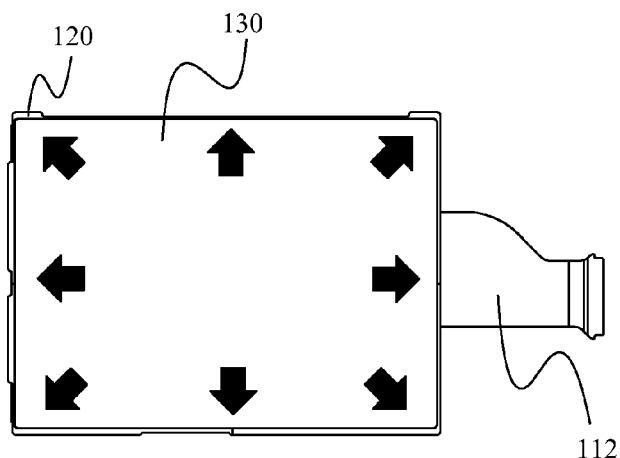

FIGS. 5A and 5B are views of the display apparatus 100 to which the spacer 120 is affixed which are seen from a display surface direction. FIG. 5A is a view of the display apparatus 100 to which the screen protector 130 has not been yet affixed, and FIG. 5B is a view of the display apparatus 100 to which the screen protector 130 has been already affixed. Arrows illustrated in FIG. 5B indicate the directions of a change of the screen protector 130 in shape which may occur if the display apparatus 100 is left under high temperature and high humidity for a long period of time. The polymethyl methacrylate forming the screen protector 130 is prone to expand under high temperature and high humidity. This characteristic leads to a greater degree of change in shape compared with that of a PET sheet forming the spacer 120 or a glass forming the liquid crystal panel 111.

Since all sides of the spacer 120 are cut by the cuts 120a to 120d, the spacer 120 can be moved upward/downward, right/left or diagonally as indicated by the arrows illustrated in FIG. 5A. This allows the spacer 120 to respond to a change in the shape of the screen protector 130 composed of the polymethyl methacrylate. More specifically, such a great degree of change in the shape of the screen protector 130 can be mitigated, which in turn makes it possible to prevent a contact of the screen protector 130 and the liquid crystal panel 110.

Figure 6A:
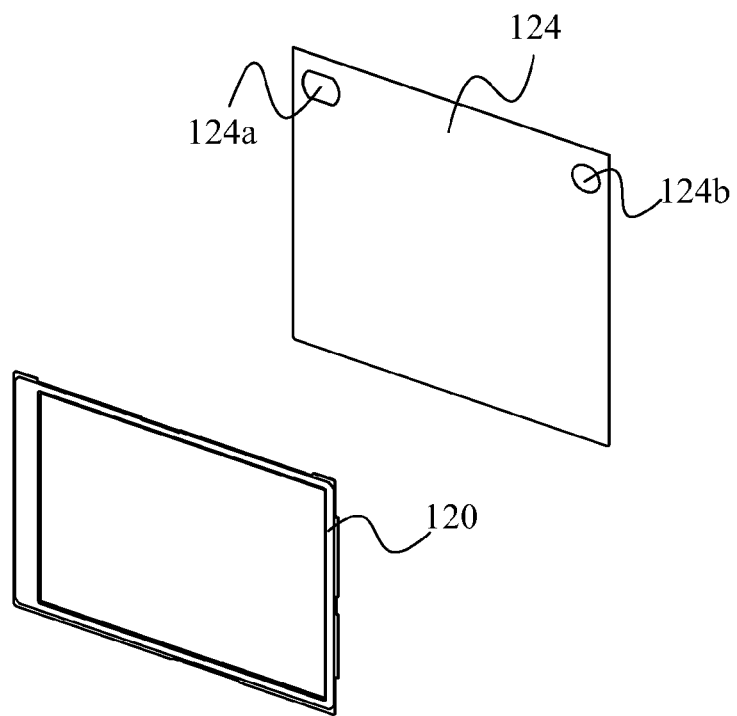
FIGS. 6A and 6B are explanatory views illustrating the cuts of the spacer.
Figure 6B:
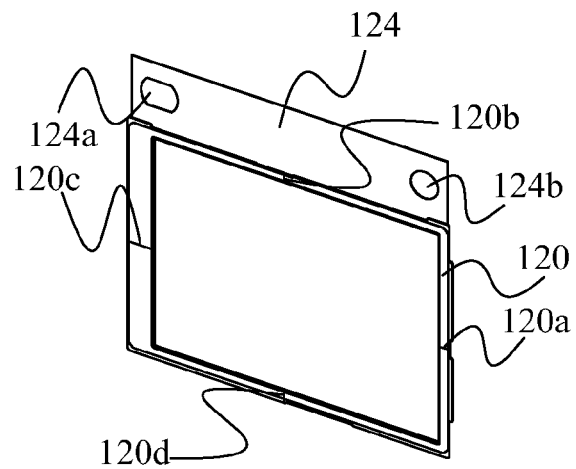

FIGS. 6A and 6B are explanatory views of the cuts 120a to 120d of the spacer 120. FIG. 6A is a view illustrating the spacer 120 with none of the cuts 120a to 120d yet created. FIG. 6B is a view illustrating the spacer 120 with all of the cuts 120a to 120d having been created.

First, the spacer 120 with none of the cuts 120a to 120d yet created is disposed on a positioning sheet 124. On the positioning sheet 124, there are created positioning holes 124a and 124b designed for use in attachment. The cuts 120a to 120d are then created to the spacer 120. This structure prevents the spacer 120 from being divided when cut and interstices from being produced at the sectional part of the cuts 120a to 120d. This means that the spacer 120 can cover the entire perimeter when the screen protector 130 and the liquid crystal unit 110 are affixed by the spacer 120, making it possible to keep dust and the like out of the display surface of the liquid crystal unit 110.

Next, when the spacer 120 is affixed to the liquid crystal unit 110, the liquid crystal panel unit 110 is disposed on a jig board (not illustrated in the figure). The positioning of the positioning holes 124a and 124b at a protruding portion for positioning disposed on the jig board makes it possible to yield a match of the locations of the liquid crystal panel unit 110 and that of the spacer 120.

(Alternative Embodiment)

Referring to FIGS. 7A to 7D, an alternative embodiment will be explained in which the spacer 120 has cuts whose positions and shapes are different from those of the above-described embodiment.

Figure 7A:
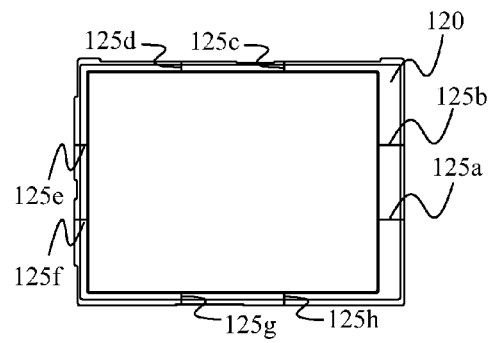
FIGS. 7A to 7D are views explaining an alternative embodiment of the cuts of the spacer.

FIG. 7A illustrates the sides of the spacer 120 divided by the cuts 125a to 125h into three approximately-equal portions. While an explanation has been given of a digital camera in the above-described embodiment, the number of the cuts of the spacer 120 may be increased by three or more. The reason for this is that when a display apparatus which is larger than the display apparatus 100 is equipped, the degree of change in the shape of the screen protector 130 also becomes larger.

Figure 7B:
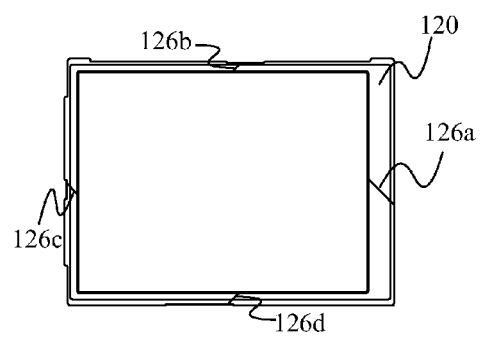

In FIG. 7B, each of cuts 126a to 126d which divides its corresponding side of the spacer 120 into two approximately-equal portions is slanted relative to its corresponding side in the in-plane direction of the liquid crystal panel unit 110.

Figure 7C:
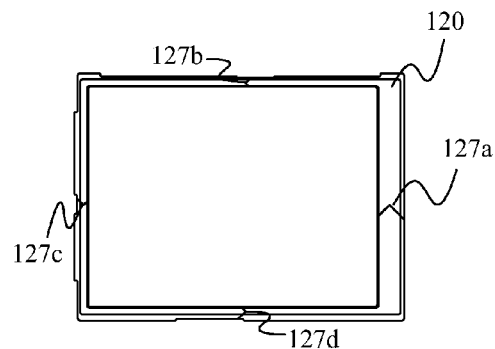

In FIG. 7C, each of cuts 127a to 127d which divides its corresponding side of the spacer 120 into two approximately-equal portions is not a straight line, but a line having at least one sharp turn.

Figure 7D:
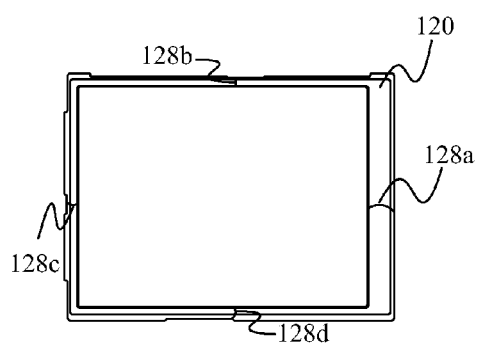

In FIG. 7D, each of cuts 128a to 128d which divides its corresponding side of the spacer 120 into two approximately-equal portions is not a straight, but a curve such as an arcuate.

In either one of FIG. 7B to 7D, the spacer 120 has a structure which makes dust and the like difficult to enter the display surface even if slight gaps occur at the cuts of the spacer 120.

As described above, this embodiment can prevent a problem that if the display apparatus is left under high temperature and high humidity for a long period of time, the screen protector changes its shape to cause a contact of the screen protector and the display surface of the liquid crystal panel at the vicinity of the center portion of the display surface, causing contact cracks on the display surface of the liquid crystal panel. This permits a decrease in the clearance between the screen protector and the liquid crystal panel, thereby making it possible to provide a thinner and cheaper display apparatus.

While, in this embodiment, the description has been made with reference to the digital camera 1 equipped with the display apparatus 100, the present invention can be applied not only to image-pickup apparatuses such as digital cameras, but also to other electronic devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283776, filed on Dec. 27, 2012, which is hereby incorporated by reference herein in its entirety.

What is claimed is:

1. A display apparatus comprising:
 a liquid crystal panel unit including a quadrilateral display portion;
 a screen protector protecting the liquid crystal panel unit; and
 a spacer disposed between the liquid crystal panel unit and the screen protector so as to surround the display portion,
 wherein the spacer has a cut, the cut cutting its corresponding side of the spacer.

2. The display apparatus according to claim 1,
 wherein the spacer has a plurality of cuts, and
 wherein each of the cuts cuts its corresponding side of the spacer.

3. The display apparatus according to claim 2, wherein each of the cuts divides its corresponding side of the spacer into two equal portions.

4. The display apparatus according to claim 1, wherein the spacer includes a second adhesion layer affixed to the screen protector, a first adhesion layer affixed to the liquid crystal panel unit, and a spacer layer between the first adhesion layer and the second adhesion layer, the spacer layer ensuring a clearance between the screen protector and the liquid crystal panel unit.

5. The display apparatus according to claim 1,
 wherein the spacer layer is a black synthetic resin sheet, and
 wherein the outer dimension of the spacer layer is larger than that of the screen protector.

6. The display apparatus according to claim 1, wherein a pair of sectional parts of the cut are in contact with each other.

7. The display apparatus according to claim 1, wherein the cut is slanted relative to its corresponding side of the spacer in an in-plane direction of the liquid crystal panel unit.

8. The display apparatus according to claim 1, wherein the cut is a line having at least one sharp turn or is a curve.

9. An electronic apparatus comprising:
 the display apparatus according to claim 1.

* * * * *